United States Patent [19]
Trueb et al.

[11] Patent Number: 5,540,255
[45] Date of Patent: Jul. 30, 1996

[54] THERMAL INSULATION FOR P-TRAP PIPING

[75] Inventors: Steven R. Trueb; Thomas W. Trueb, both of Ellington, Conn.

[73] Assignee: Truebro, Inc., Ellington, Conn.

[21] Appl. No.: 426,084

[22] Filed: Apr. 21, 1995

Related U.S. Application Data

[63] Continuation-in-part of Ser. No. 199,959, Feb. 22, 1994, Pat. No. 5,419,364, which is a continuation-in-part of Ser. No. 44,026, Apr. 8, 1993, Pat. No. 5,303,730, which is a continuation-in-part of Ser. No. 944,836, Sep. 14, 1992, Pat. No. 5,259,410, which is a continuation-in-part of Ser. No. 754,048, Sep. 3, 1991, Pat. No. 5,163,469, which is a continuation-in-part of Ser. No. 569,995, Aug. 20, 1990, Pat. No. 5,054,513.

[51] Int. Cl.⁶ ................... F16L 7/00; F16L 9/22
[52] U.S. Cl. .................. 137/375; 138/155; 138/158
[58] Field of Search .................. 137/375, 247.51, 137/797; 138/47, 155, 158

[56] References Cited

U.S. PATENT DOCUMENTS

| | | | |
|---|---|---|---|
| 124,770 | 3/1872 | Stetson et al. | |
| 2,650,180 | 8/1953 | Walker | 154/44 |
| 2,937,662 | 5/1960 | Green | 138/25 |
| 3,153,546 | 10/1964 | Dunn | 285/13 |
| 3,177,528 | 4/1965 | Flower et al. | 18/36 |
| 3,402,731 | 9/1968 | Martin | 137/375 |
| 3,559,694 | 2/1971 | Volberg | 138/147 |
| 3,598,157 | 8/1971 | Farr et al. | 138/157 |
| 3,719,209 | 3/1973 | Rush et al. | 138/177 |
| 3,960,181 | 6/1976 | Baur et al. | 138/178 |
| 4,205,105 | 5/1980 | Blundell | 428/36 |
| 4,441,743 | 4/1984 | Steenberger | 285/21 |
| 4,463,780 | 8/1984 | Schultz et al. | 138/178 |
| 4,669,509 | 6/1987 | Botsolas | 138/178 |
| 4,840,201 | 6/1989 | Botsolas | 138/178 |
| 5,054,513 | 10/1991 | Trueb et al. | 137/797 |
| 5,259,410 | 11/1993 | Trueb et al. | 137/797 |

FOREIGN PATENT DOCUMENTS 2538076 12/1982 France.
3723394 7/1987 Germany.

OTHER PUBLICATIONS

Skal+Gard (TCI Products) 4–Page brochure dated Oct. 1994.

*Primary Examiner*—A. Michael Chambers
*Attorney, Agent, or Firm*—Ira S. Dorman

[57] ABSTRACT

Pieces of thermal insulating molded rubber are configured to conform to under-sink piping, so as to provide protection against burn injury from contact with hot surfaces. The pieces are telescopically and interengaged with one another at selected relative orientations, to cooperatively enclose a P-trap assembly, and the piece covering the J-bend is formed with a protrusion to accommodate clean-out structure provided thereon.

9 Claims, 2 Drawing Sheets

THERMAL INSULATION FOR P-TRAP PIPING

CROSS-REFERENCE TO RELATED APPLICATION

This application is a continuation-in-part of application for Letters Patent Ser. No. 08/199,959, filed Feb. 22, 1994 and now issued as U.S. Pat. No. 5,419,364, which is a continuation-in-part of application for Letters Patent Ser. No. 08/044,026, filed Apr. 8, 1993 and now issued as U.S. Pat. No. 5,303,730, which is a continuation-in-part of application for Letters Patent Ser. No. 07/944,836, filed Sep. 14, 1992 and now issued as U.S. Pat. No. 5,259,410, which is a continuation-in-part of application for Letters Patent Ser. No. 07/754,048, filed Sep. 3, 1991 and now issued as U.S. Pat. No. 5,163,469, which is in turn a continuation-in-part of application for Letters Patent Ser. No. 07/569,995, filed Aug. 20, 1990 and now issued as U.S. Pat. No. 5,054,513.

BACKGROUND OF THE INVENTION

Regulations in place in many municipalities require that the so-called "P-trap" assembly (i.e., the waste-water piping under sinks and the like), and the hot-water-supply piping, be insulated so as to prevent injury from contact with hot metal surfaces. Wheelchair-bound individuals are at particular risk.

The required thermal insulation may be supplied by wrapping or otherwise applying lengths of insulation (such as of foam rubber and the like) about the pipes. Such practices are however undesirable for a number of reasons: application is often difficult and time-consuming; the applied insulating material tends to become disoriented and displaced; the finished installation is typically unaesthetic; and often the result is simply ineffective.

The prior art suggest a wide variety of pipe covering techniques and structures. For example, Far et al U.S. Pat. No. 3,598,157 discloses preformed covering pieces made of foamed plastics and configured for various pipe fittings. Blundell U.S. Pat. No. 4,205,105 shows an elongated pipe-insulating structure that is axially slit along one side, and Martin U.S. Pat. No. 3,402,731 provides foamed insulating sleeves for pipe elements.

U.S. Pat. Nos. 2,650,180, 2,937,662, 3,153,546, 3,559,694, 4,441,743 and 4,840,201, to Walker, Green, Dunn, Volberg, Steenbergen and Botsolas, respectively, all show encased insulating structures applied to pipes and fittings; U.S. Pat. Nos. 3,960,181, 4,463,780 and 4,669,509, to Baur et al, Schultz et al and Botsolas, respectively, provide one-piece covering wrappings fabricated from flexible plastic materials; and U.S. Pat. Nos. 3,177,528 and 3,719,209, to Flower et al and Rush et al, respectively, are directed to electrically insulated coatings for pipe fittings and to extruded plastic plumbing traps.

Despite the activity in the art indicated by the foregoing, there has been a need for means by which under-sink piping can quickly, easily, and inexpensively be thermally insulated. The inventions claimed in Applicants' U.S. Pat. Nos. 5,054,513, 5,163,469, 5,259,410 and 5,303,730, and in their copending application Ser. No. 08/199,959, provide thermal insulation systems and installations by and in which the foregoing needs are well satisfied; the invention hereof augments the foregoing.

SUMMARY OF THE INVENTION

It is a broad object of the present invention to provide novel means by which under-sink piping can quickly, easily, and inexpensively be thermally insulated.

More specific objects of the invention are to provide a thermal insulation system that is adapted for ready installation upon under-sink piping, so as to provide highly effective protection against burn injury form hot metal surfaces; to provide such a system which also provides protection against cuts and abrasions; and to provide such a system which is, in addition, of relatively simple and inexpensive construction, quick and easy to apply, and neat, stable, and aesthetically pleasing when in place.

It has now been found that certain of the foregoing and related objects of the invention are attained by the provision of a thermal insulation system comprising a first, substantially J-shaped tubular piece, a second, substantially straight tubular piece, and a third, substantially L-shaped tubular piece, the pieces being fabricated from a resiliently yieldable material, normally of rubbery character, having thermal insulating properties. At least one (and usually both) of the end portions of the first piece is of circular external cross-sectional configuration, and one of the end portions of the third piece (and usually of the second piece, as well) constitutes a collar portion with an inwardly extending circular recess; the recess is dimensioned to telescopically seat a corresponding one of the end portions of the first piece therewithin, permitting relative orientation thereof throughout a range of rotated positions. The J-shaped piece will preferably include a toric section having a protrusion formed in a centralized location on a radially outer wall portion thereof, for surrounding clean-out access port structure on the J-shaped piping component of the installation.

Other objects of the invention are attained by the provision of a thermally insulated P-trap sink installation, comprising the insulation system herein described installed upon a tubular piping assembly. The piping assembly will include a substantially straight sink tailpiece member, a substantially J-shaped J-bend, a substantially L-shaped waste arm, and nut structure joining the tailpiece member and waste arm in end-to-end relationship to the opposite ends of the J-bend.

DETAILED DESCRIPTION OF THE ILLUSTRATED EMBODIMENTS

Figure 1:
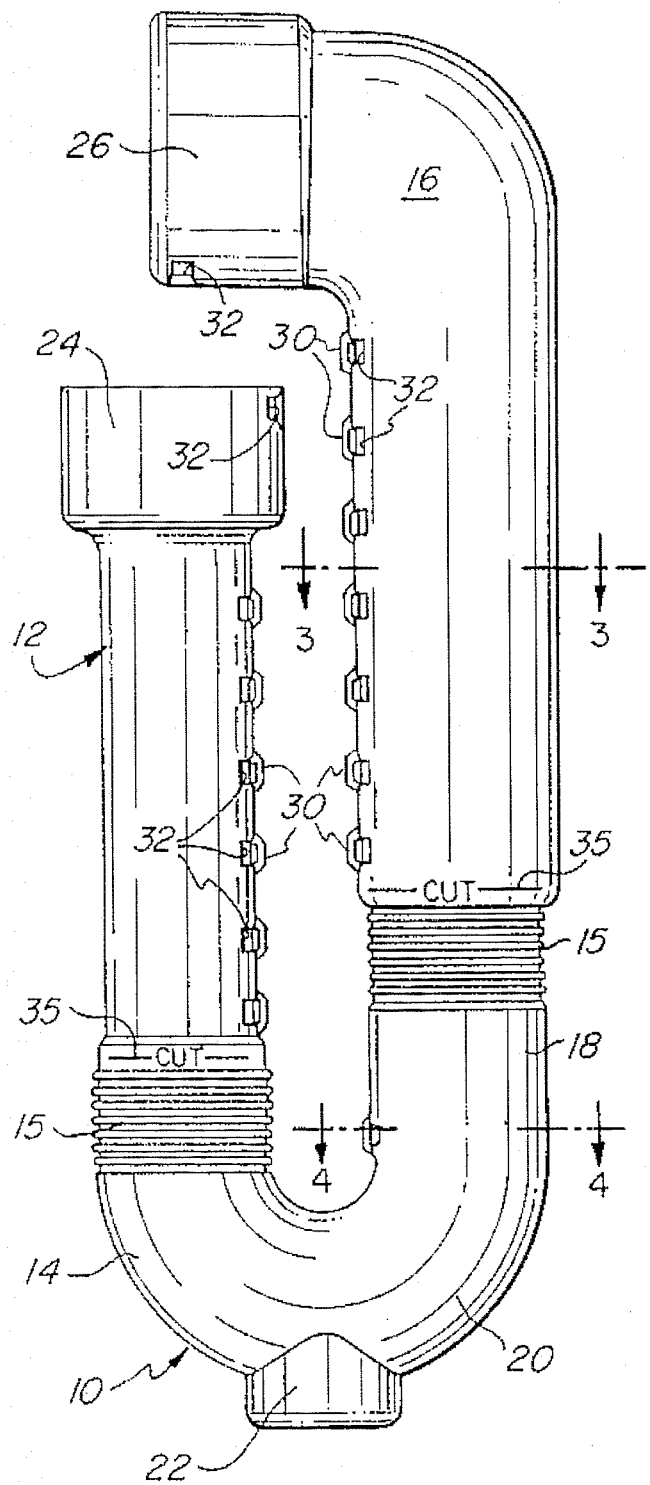
FIG. 1 is an elevational view of an article comprising thermal insulation embodying the present invention.

FIG. 1 of the drawings illustrates a unitary article, molded from a resiliently yieldable, rubbery, thermally insulating material, and comprising three sections from which insulating pieces are produced. More particularly, the article is of generally circular cross section throughout its entire length, and includes a substantially J-shaped tubular section, generally designated by the numeral 10, a substantially straight tubular section generally designated by the numeral 12 and connected to the longer leg 18 of the section 10, and a substantially L-shaped section generally designated by the numeral 16 and connected to the shorter leg 14 of the section 10; the sections 10, 12 and 16 are demarcated by the "CUT" lines 35. Collar portions 24 and 26 are provided on the free end portions of the straight section 12 and the L-shaped section 16, respectively, and the toric portion 20 of the J-section 10 is formed with a circular protrusion 22.

Figure 3:
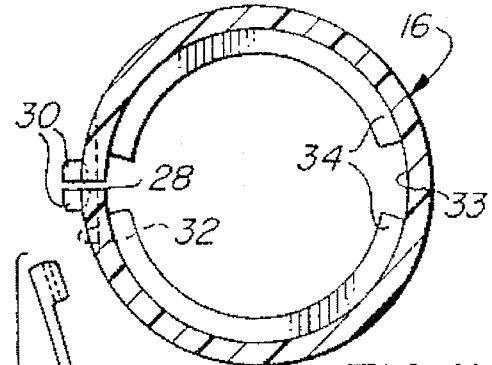
FIG. 3 is a sectional view taken along line 3—3 of FIG. 1.
Figure 4:
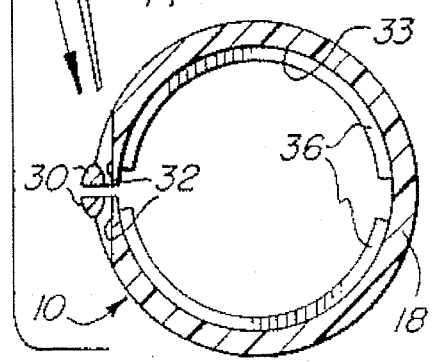
FIG. 4 is a sectional view taken along line 4—4 of FIG. 1.

Although not visible in FIG. 1, the article is slit continuously along its inner periphery, to provide longitudinal slits 28 in the several sections. However, it will be appreciated that the insulation may be furnished fully intact (i.e., in seamless form) for on-site adaptation, if so desired. Aligned slot portions 32 are formed through bosses 30 on the marginal portions contiguous to the slits 28, which provide slots that extend generally tangentially to the internal circumferential surface defining the passageway 33 through the article; these features are best seen in FIGS. 3 and 4. As is also seen therein, substantially semiannular rib elements 34 and 36 project into the passageway 33 from the inside surfaces on the sections 16 and 10, respectively (similar rib elements 31 are provided within the section 12).

Figure 5:
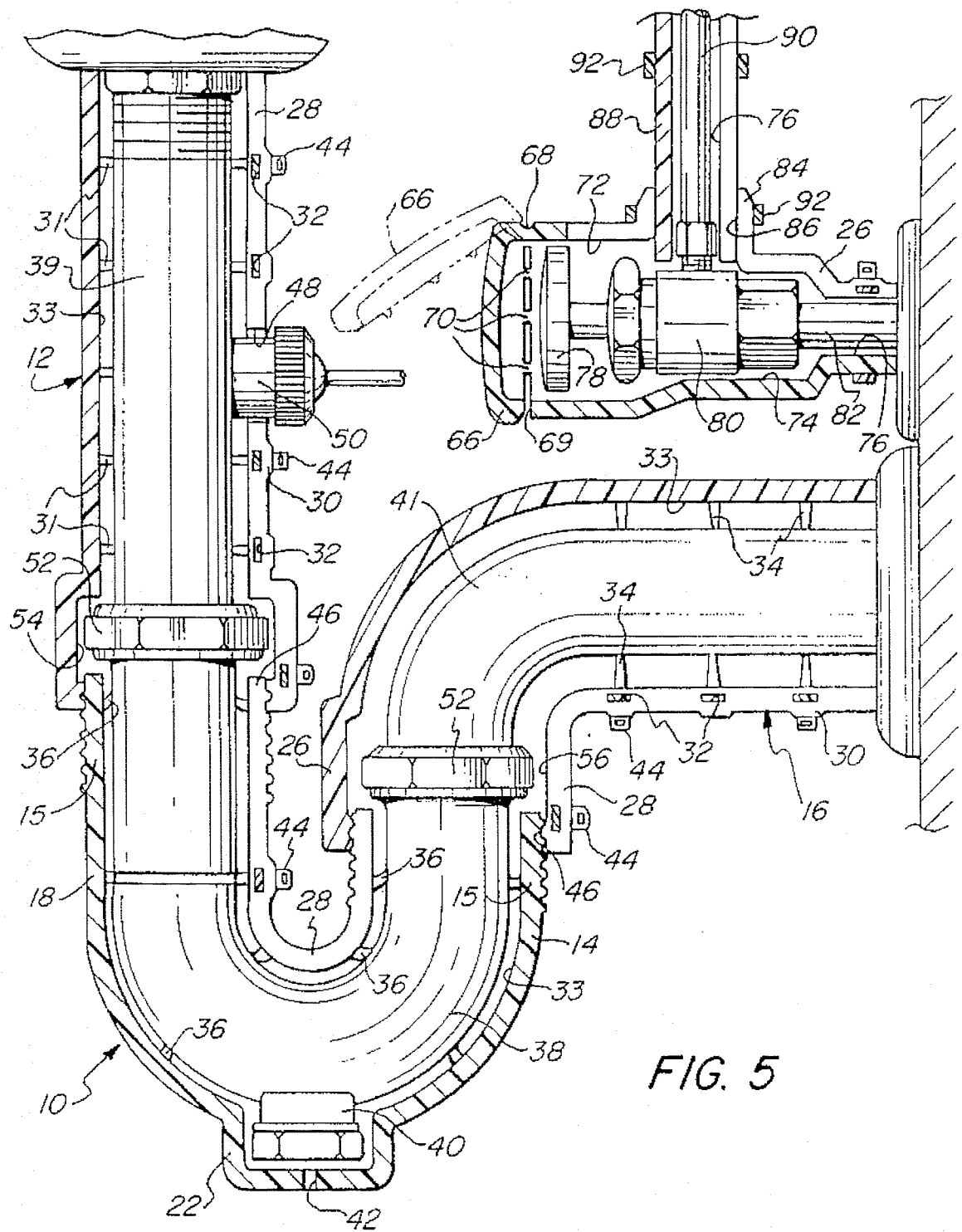
FIG. 5 is an elevational view depicting under-sink piping upon which is installed thermal insulation (shown in section) embodying the invention.

As depicted in FIG. 5, the article has been converted into three pieces by cutting it at the locations 35, and the pieces (designated by the numerals of the sections to which they correspond) are assembled in an end-to-end arrangement on the under-sink, P-trap assembly illustrated. The piping consists of a J-bend 38, covered by the piece 10, a tail piece 39 covered by the piece 12, and a waste arm 41 covered by the piece 16. Pipes 38, 39 and 41 are joined to one another by standard coupling nuts 52, which are accommodated within the spaces 54, 56 defined respectively by the collar portions 24 and 26. As will be noted, the collar portions are formed with internally corrugated entrance structure 46, which cooperates with the corrugated end portions 15 on both legs 14 and 18 of the piece 10 for enhanced interengagement. The insulation sections 10, 12 and 16 are secured in place by conventional ratchet-acting plastic bands or fasteners 44 (used for example for electrical wire bundling), which are threaded through the aligned tangential slot portions 32 and tightened about the overlying bosses 30.

As will be noted, in receiving the pipes certain of the internal ribs 31, 34, 36 have become slightly distorted, while others have maintained substantially their as-molded shape. This serves of course to permit the insulation to accommodate and closely fit the piping, despite variations in its dimensions and configurations, and it permits fabrication of somewhat oversize parts, for more universal application. The ribs also serve to keep the main body (i.e., sidewall) of the insulation out of direct contact with the piping, thereby increasing its thermal insulating value as well as affording enhanced physical cushioning effects.

The clean-out nut and associated structure 40 on the J-bend 38 are surrounded and enclosed within the well that is formed by the protrusion 22 on the toric portion 20 of the piece 10, which protrusion can simply be cut away when access to the clean-out structure 40 is required; the weep hole 42 in the protrusion 22 serves to prevent the buildup of water due to possible leakage within the system. It will be noted that a circular opening 48 has been cut along the slit 28 in the piece 12, for the purpose of accommodating the projecting pop-up valve structure 50 on the tail piece 39. It will also be noted that the paired apertures 32 are in radial registry with one of the ribs 31, 34 or 36, as is desirable from the standpoint of providing underlying support against tightening of the fastening bands, and that they are located on the inwardly directed (or otherwise obscured) portions of the installed insulation; this not only makes them less obtrusive from an aesthetic standpoint, but it also makes the fasteners (which may have sharp or ragged edges after trimming) less accessible for injurious contact.

Figure 2:
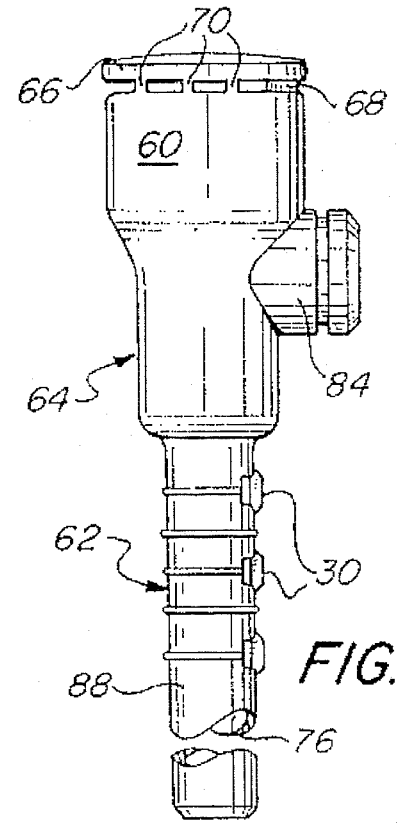
FIG. 2 is a fragmentary elevational view of an insulating piece for covering angle valve piping and an associated water supply tube.

With added references now to FIG. 2, the insulating piece shown therein consists of an elongate tubular body that includes a valve handle-covering portion at one end, a pipe-covering portion at the other end, and an intermediate valve body-covering portion, which portions are generally designated respectively by the numerals 60, 62 and 64. As is best seen in FIG. 5, a primary passage extends along the longitudinal axis of the insulating piece; it consists of a relatively large section 72 at one end, for the containment of the handle 78 and associated structure of the angle valve, a smaller adjacent section 74 for the containment of the valve body 80, and a still smaller opposite end section 76 for receipt of the water inlet pipe 82.

Cover component 66 is integrally formed with the body of the insulation, and is attached thereto by a hinge element 68. A circumferential slot 69 extends from the ends of the hinge element 68 and substantially surrounds the cover component 66, the slot 69 being interrupted by a number of nips or weak connecting elements 70 at spaced locations therealong. When access to the valve handle 78 is desired, the cover component 66 can readily be displaced (e.g., to the phantom-line position of FIG. 5) by pivoting it away from the main body portion on the hinge element 68, easily tearing the connecting elements 70. Because the hinge element 68 is positioned at the top of the insulation, as installed, the cover component 66 will of course inherently assume a substantially closed position in the absence of lifting force.

Collar structure 84, also formed at the top of the insulation (along the slit 26), defines a secondary passage 86 into the valve-covering portion 60, 64 of the tubular body; it is of circular cross section, and has a diameter substantially the same as the outside diameter of the pipe-covering portion 62. To complete the installation, the portion 62 is cut at an appropriate point along its length, thus producing a separate piece 88. The piece 88 is placed over the water supply tube 90 with its lower end portion inserted into the secondary passage 86, and may be secured in place with a surrounding plastic band 92.

Although the drawings and the corresponding parts of the specification describe the best mode contemplated for carrying out the invention, it will be understood that variations can be made without departing from the novel concepts hereof. For example, although the pieces are conveniently formed integrally, using any molding technique that may be appropriate under the circumstances, each piece may be produced individually, if so desired. The insulating pieces will normally be fabricated from a synthetic elastomeric material such as polyurethane, polyvinyl chloride, or silicon rubber, so as to provide the desired resiliency for facile installation as well as a suitable thermal conductivity value, good cushioning effects, and other desired properties. The material used may have a foamed structure and any desired coloration, and the insulation will typically have a nominal wall thickness ranging from ⅛ inch to ½ inch, with ¼ inch often providing a most desirable balance of functional properties and cost factors. A complete P-trap insulating system may conveniently be produced as a one-piece article. Alternatives to the plastic fastening bands described will occur to those skilled in the art, and it will be appreciated that the system can be used to insulate piping of plastic as well as of metal. Finally, although the pipe-covering portion 62 is shown to be of substantially uniform, circular cross section along its entire length, it will be appreciated that it may be made with sections of different sizes and shapes, as long as there is at least one section (at a suitable location) that is dimensioned and configured to fit within the structure defining the passage 86.

Thus, it can be seen that the present invention provides novel means by which under-sink piping can quickly, easily, and inexpensively be thermally insulated. The thermal insulation system is adapted for ready installation upon under-sink piping, so as to provide highly effective protection against burn injury from hot metal surfaces, and against cuts and abrasions. It is, in addition, of relatively simple and inexpensive construction, quick and easy to apply, and neat, stable and aesthetically pleasing when in place.

Having thus described the invention, what is claimed is:

1. A thermal insulation system for the P-trap piping assembly of a sink or the like, comprising a first, substantially J-shaped tubular piece, a second, substantially straight tubular piece, and a third, substantially L-shaped tubular piece, each of said pieces having opposite end portions, and each being of unitary construction and fabricated from a resiliently yieldable material having thermal insulating properties, at least one of said end portions of said first piece being of circular external cross-sectional configuration, and one of said end portions of at least said third piece constituting a collar portion having an inwardly extending recess of circular cross-sectional configuration, said recess being dimensioned to telescopically seat said one end portion of said first piece, overlapped by said collar portion, for relative orientation throughout a range of rotated positions.

2. The system of claim 1 wherein both of said end portions of said first piece are of circular external cross-sectional configuration, and wherein one of said end portions of said second piece constitutes a collar portion having a said recess dimensioned to so seat the other of said end portions of said first piece.

3. The system of claim 1 wherein said material is of rubbery character.

4. The system of claim 1 wherein said first piece includes a toric section having a protrusion formed in a centralized location on a radially outer wall portion thereof, for surrounding clean-out access port structure provided in the J-shaped piping component of a P-trap sink installation.

5. A thermal insulation system for the P-trap piping assembly of a sink or the like, comprising a first, substantially J-shaped tubular piece, a second, substantially straight tubular piece, and a third, substantially L-shaped tubular piece, each of said pieces having opposite end portions, and each being of unitary construction and fabricated from a resiliently yieldable material having thermal insulating properties, said first piece including a toric section having a protrusion formed in a centralized location on a radially outer wall portion thereof, for surrounding clean-out access port structure provided in the J-shaped piping component of a P-trap sink installation.

6. A thermally insulated P-trap installation for a sink or the like, comprising:

a tubular piping assembly including a substantially straight sink tailpiece member, a substantially J-shaped J-bend, a substantially L-shaped waste arm, and nut structure joining said tailpiece member and waste arm in end-to-end relationship to the opposite ends of said J-bend; and a thermal insulation system comprising a first, substantially J-shaped tubular piece, a second, substantially straight tubular piece, and a third, substantially L-shaped tubular piece, each of said pieces having opposite end portions and being of unitary construction and fabricated from a resiliently yieldable material having thermal insulating properties, said pieces being constructed for installation of said first, second and third pieces, respectively, over said J-bend, tailpiece member, and waste arm of said piping assembly, said pieces being so installed with one of said end portions of at least said third piece disposed in overlapped relationship with one of said end portions of said first piece, said one end portion of said first piece being of circular external cross-sectional configuration, and said one end portion of said third piece constituting a collar portion having an inwardly extending recess of circular cross-sectional configuration, said recess being dimensioned to telescopically seat said one end portion of said first piece, overlapped by said collar portion, for relative orientation throughout a range of rotated positions.

7. The installation of claim 6 wherein said material from which said pieces are fabricated is of rubbery character.

8. The installation of claim 6 wherein said J-bend of said piping assembly includes a toric section and two substantially straight sections extending in the same direction from said toric section, one of said straight sections being longer than the other and being joined to said substantially straight tubular piece, the other of said straight sections being joined to said substantially L-shaped tubular piece.

9. The installation of claim 8 wherein said toric section of said J-bend has outwardly projecting clean-out structure formed in a centralized location through a radially outer wall portion thereof, and wherein said first piece of said insulation system includes a toric section having a protrusion formed in a centralized location on a radially outer wall portion thereof, surrounding said clean-out structure.

* * * * *